SHIFT REGISTER HAVING MAIN AND AUXILIARY SHIFT WINDINGS

Filed June 26, 1964

INVENTORS
ROY W. REACH
DAVID SHAPIRO
BY, Wolf, Greenfield & Hieken
ATTORNEYS

INVENTORS
ROY W. REACH
DAVID SHAPIRO
BY, Wolf, Greenfield & Hieken
ATTORNEYS

INVENTORS
ROY W. REACH
DAVID SHAPIRO
BY,
Wolf, Greenfield + Hieken
ATTORNEYS

SHIFT REGISTER HAVING MAIN AND AUXILIARY SHIFT WINDINGS

Filed June 26, 1964

INVENTORS
ROY W. REACH
DAVID SHAPIRO

BY,
Wolf, Greenfield & Hieken
ATTORNEYS

INVENTORS
ROY W. REACH
DAVID SHAPIRO

United States Patent Office 3,438,011
Patented Apr. 8, 1969

3,438,011
SHIFT REGISTER HAVING MAIN AND AUXILIARY SHIFT WINDINGS

Roy W. Reach, Sudbury, and David Shapiro, Lincoln, Mass., assignors, by mesne assignments, to Barry Wright Corporation, Watertown, Mass., a corporation of Massachusetts Filed June 26, 1964, Ser. No. 382,435
Int. Cl. G11b *5/06*
U.S. Cl. 340—174 11 Claims

ABSTRACT OF THE DISCLOSURE

A magnetic core shift register has main and auxiliary shift pulse windings, an input winding and an output winding having more turns than the input winding. A diode couples the output winding of one stage to the input winding of the following stage. There is a source of main shift pulses and auxiliary shift pulses with means for applying one of the main shift pulses to the main shift winding of one storage element and one of the auxiliary pulses to the auxiliary shift winding of a following storage element in overlapping time relationship so that the main pulse energy establishes the reset state in the one element output winding when that element is thereby switched from the set state which output pulse is coupled by the diode to the following core stage input winding to oppose the switching energy then applied to the following core stage auxiliary winding and prevent the following core stage from being switched to the set state, the switching energy then applied to the following core stage auxiliary winding otherwise being sufficient to establish the set state in the following core stage.

The present invention relates in general to data storage and more particularly concerns a novel magnetic core shift register and its method of manufacture characterized by exceptionally high bit-to-component capacity. Novel fabrication techniques facilitate inexpensive and rapid assembly of many cascaded stages to form a shift register in which a single wire forms input and output windings of a multistage shift register. A specific commercially manufactured shift register according to the invention stores a 48 bit word received in serial form through a transistor directly driving the input core and ejected in serial form from the output core to a transistor flip-flop.

One type of conventional two-core-per-bit magnetic shift register employs a two-phase clocking system. A diode links the core of the first phase to the core of the second phase in a core pair required to store one bit. Another diode links the second phase core to the first phase core of the pair storing the following bit. If the first phase core had been previously set to a ONE state, energy from the drive or shift source sets the second phase core. If the first phase core had been in the reset or ZERO state prior to receiving the drive or shift current, there would be no flux change in the first phase core, and consequently no energy transfer to the second core. While these shift registers perform satisfactorily in many application, they are characterized by at least the following disadvantages; (1) two cores and two diodes per bit, (2) relatively large driving power requirements, and (3) relatively large turns ratio. The latter two disadvantages occur because the driving energy both resets the first phase core and sets the second phase core. The large turns ratio is generally required to present a sufficiently high back impedance to the second phase core looking into the first phase core so that when the second phase core is driven, insufficient current flows from the second phase core to the first phase core to affect the state of the latter.

While there exist single-bit-per-core registers, the reduction in bit-to-core ratio is usually accomplished by substituting a delay furnished by lumped parameter delay networks for the delay provided by the second phase core. This scheme has the disadvantage that still higher driving energy is required to compensate for losses in the coupling delay network. Moreover, the delay network itself is both costly and relatively complicated.

The present invention has as an important object reducing power requirements for shifting a magnetic core shift register.

It is another object of the invention to achieve the preceding object with both a very low turns ratio of windings on a core and a small number of turns on the data input and data output windings of each core.

It is still another object of this invention to achieve the preceding objects while maintaining a high bit-to-component ratio.

It is still a further object of this invention to fabricate magnetic shift registers which achieve the preceding objects comprising a large number of cascaded stages having input and output windings formed by a single continuous wire.

Still another object of the invention is to achieve the preceding objects with a shift register operable by conventional saturating switching amplifiers and providing sufficient output to directly drive the input of a saturating switching amplifier.

According to the invention, each shift register core comprises magnetic material capable of assuming first and second stable states and switchable from one state to the other only upon energization of a magnetomotive force of proper sense and magnitude that exceeds a prescribed threshold level. A first core of this type may be driven by a pulse from a first magnetomotive force source to shift out energy when this core then resides in the set or ONE state while the succeeding core is driven by a second source of a magnetomotive force of lesser magnitude and duration than the first force. The magnitude and duration of the energy pulse provided by the second source is substantially the amplitude and duration required to set the second core to the ONE state. The input link to the second core from the first core is arranged so that current flowing in this link in response to the first core being reset from the ONE state to the ZERO state by the first source, will produce a magnetomotive force opposing that provided to the second core from the second magnetomotive force source. This relationship establishes a net magnetomotive force in the second core that is too small to switch that core from the ZERO state to the ONE state. If the first core had been previously in the ZERO state, the magnetomotive force from the first source would not switch the first core; hence, no current would flow in the link between the first core output winding and the second input winding. Therefore, there would be no current introduced in this link to oppose the magnetomotive force provided by the second source. Consequently, the pulse provided by the second source switches the second core from the ZERO state to the ONE state. In summary, each bit is sequentially shifted to a following stage, but the complement of the shifted bit is stored in that following stage.

This arrangement provides certain unobvious advantages. When the first core is reset, it inhibits the second core from switching so that the impedance presented by the second core input winding to the first core output winding is nearly zero. This low loading impedance need be driven by only a small voltage which can be provided by a very small number of output turns while still providing adequate current to the second core input winding. In a practical embodiment of the invention, the first core output winding is only five turns while a single turn forms the second core input winding.

According to another feature of the invention, a unilaterally coupling device couples the first core output winding to the second core input winding and is poled to transmit the inhibiting current while impeding the flow of current from the second core to the first core by blocking the flow of current from the second core to the first core when drive or shift power is applied to the second core.

Although ordinarily a diode so poled would transmit current in the link between the first and second cores in response to the second source setting the second core when the first core had previously stored a ZERO, the potential then developed across the single turn input winding is smaller than the threshhold potential of the diode in the coupling link so that the diode still performs a current blocking function. However, the five turn output winding of the first core provides a potential sufficient to overcome the threshold potential of the unilaterally conducting device when current flow is desired.

According to still another feature of the invention, pairs of core stages like those described are cascaded and magnitude, duration and timing of shifting power controlled to shift the digital data from core to core. The data is thus shifted with little driving energy through simple coupling means comprising windings having a small number of turns and a low turns ratio.

Still another feature of the invention resides in the provision of a multiple phase set of shift pulses for sequencing the data down the chain so that with $n$ different phases in the main drive (and associated auxiliary simultaneous drive), $n$ cores can store $n-1$ bits of data. More specifically, in a five phase system with five main shift pulses designated $\Phi_1$, $\Phi_2$, $\Phi_3$, $\Phi_4$ and $\Phi_5$ and five auxiliary set currents designate S1, S2, S3, S4 and S5, four bits of data can be stored in five cores.

Still another unobvious characteristic of the invention facilitates rapid, inexpensive and reliable fabrication of a multistage register. If a jumper wire were connected from an input turn to one side of the output winding on the same core, no current would flow in this jumper wire because a complete conducting circuit does not exist. It has been discovered that all the input and output windings of a single register may be formed from a single piece of wire intertwined among the cores and insulation scraped from points where diode leads are to be connected.

Since the shift register according to the invention operates with a voltage output below the threshold potential of a semiconductor diode with an input turn yet above that threshold level from an output winding and since conventional transistor saturating amplifiers include a base-emitter portion with similar threshold levels, voltage (and current) compatability exist between the magnetic core circuits according to the invention and conventional transistor amplifiers. And the use of cores with rectangular hysteresis loop characteristics enhances the signal-to-noise ratio of ONE's to ZERO's from the output core to such an extent that a single capacitor integrator leading directly into the base of a transistor may function as the output coupling means.

Other features, objects and advantages of the invention will become apparent from the following specification when read in connection with the accompanying drawing, in which.

Figure 2:
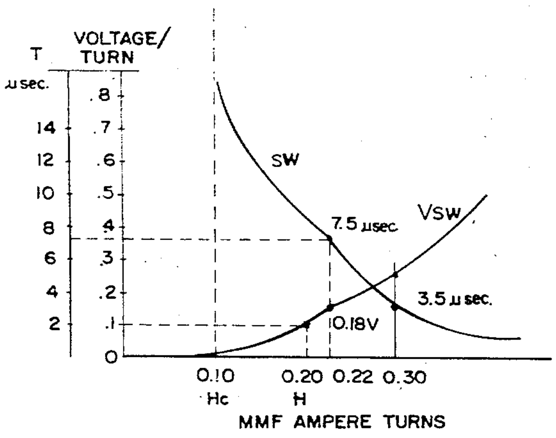
Figure 3:
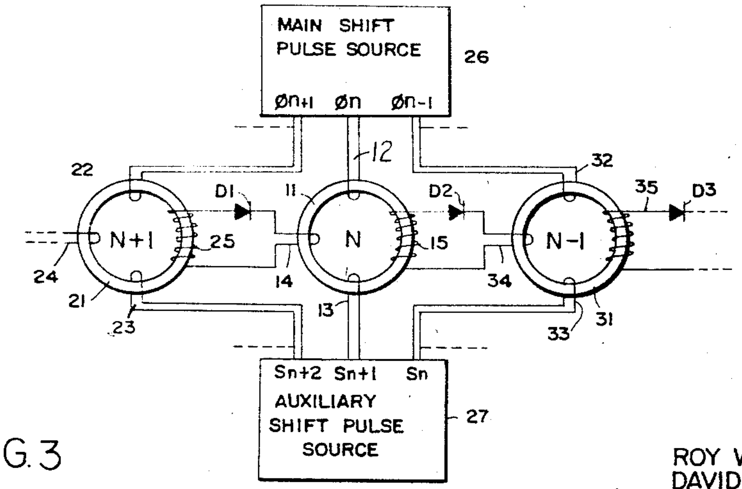
Figure 4:
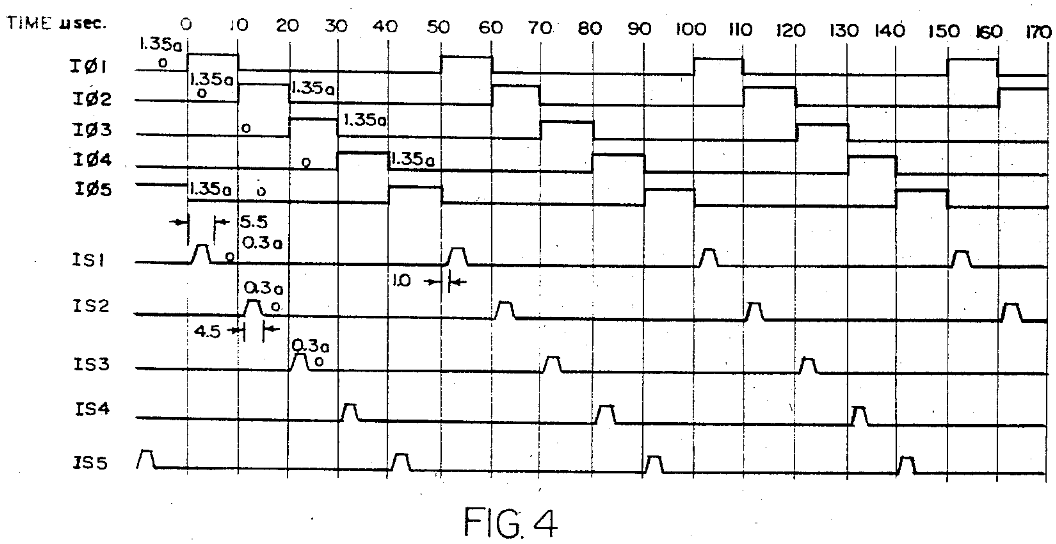
Figure 6A:
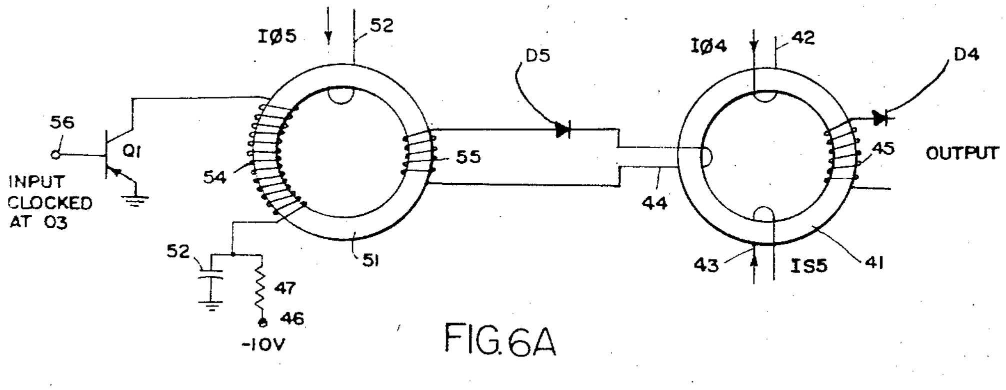
Figure 5:
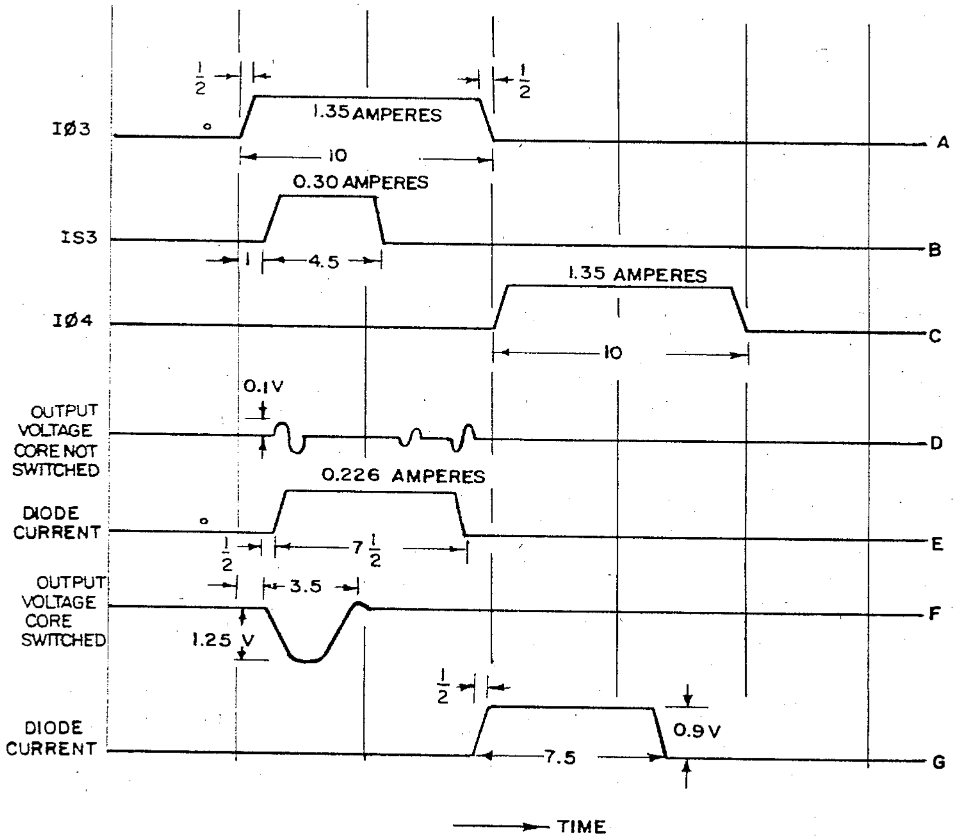

FIG. 2 graphically represents both typical core switching times and output voltages as a function of shift magnetomotive force for a core in a representative embodiment of the invention;

FIG. 3 shows a typical chain of three cores connected in accordance with the invention;

FIG. 4 is a graphical representation of pertinent signal waveforms helpful in understanding the operation of the circuit of FIG. 3;

FIG. 5 is a graphical representation of the timing relationship of signal waveforms for all the reactions of a single core;

FIG. 6A shows a schematic circuit diagram of a circuit arranged to receive data from a conventional transistor amplifier.

Figure 6B:
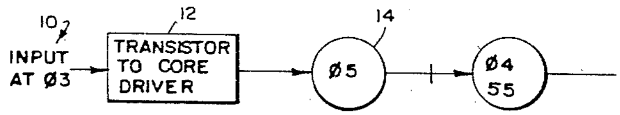

FIG. 6B shows the block diagram equivalent of the apparatus of FIG. 6A.

Figure 7A:
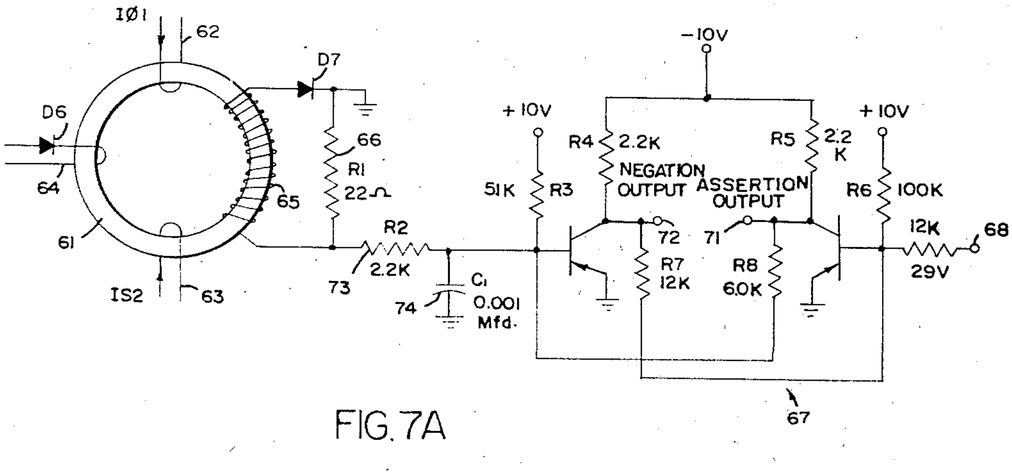

FIG. 7A shows a schematic circuit diagram of an amplifier circuit for receiving and storing the output of a core in the chain.

Figure 7B:
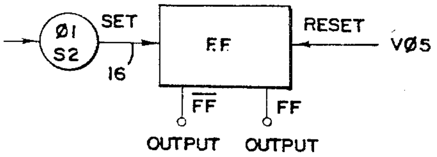

FIG. 7B shows the block diagram equivalent of the apparatus of FIG. 7A.

Figure 8:
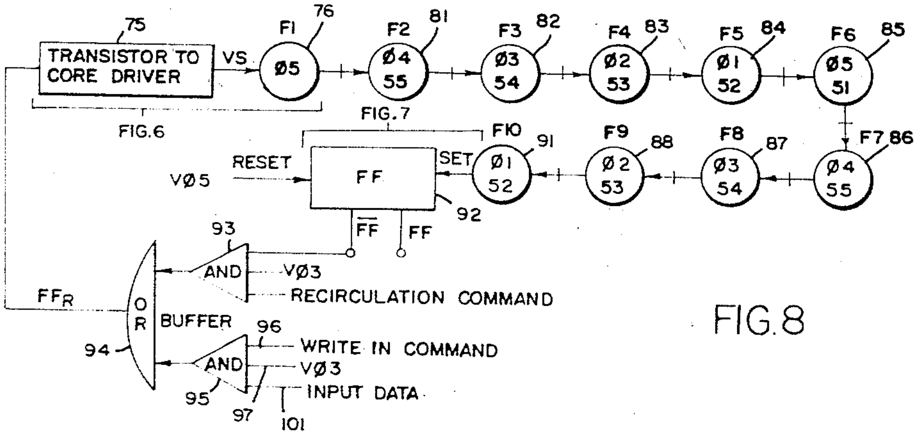
Figure 9:
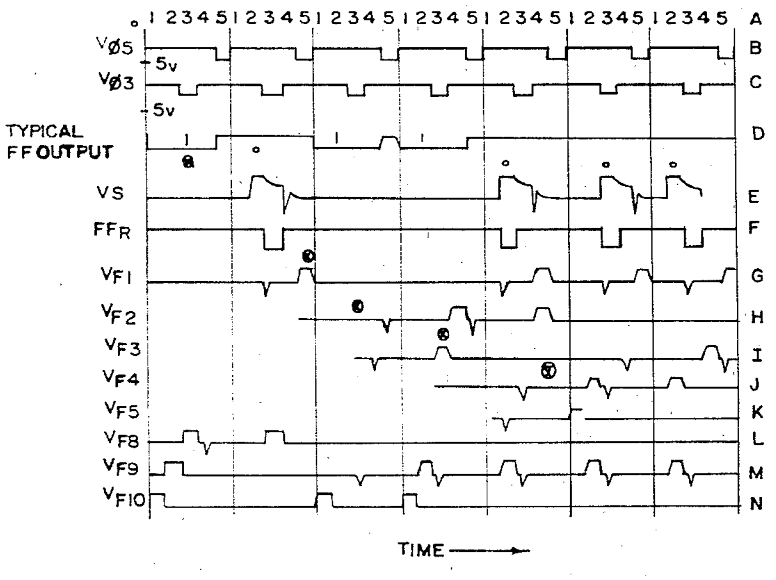
Figure 10A:
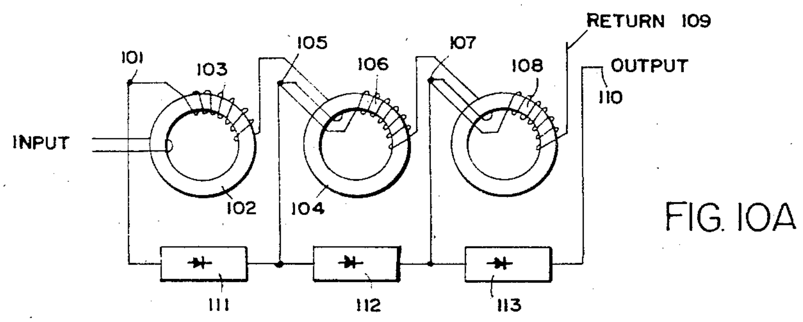
Figure 10B:
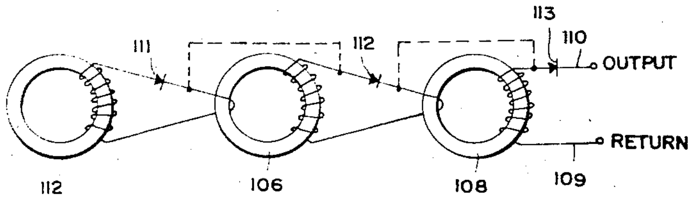

FIG. 8 shows the logical arrangement of a system according to the invention having a ten bit storage loop;

FIG. 9 is a graphical representation of signal waveforms plotted to a common time scale helpful in understanding the operation of the system of FIG. 8; and FIGS. 10A and 10B ilustrate the technique for winding input and output windings according to the invention.

With reference now to the drawing and more particularly FIG. 1 thereof, there is shown a schematic circuit diagram of an exemplary embodiment of a core stage according to the invention and the logical equivalent thereof. Each stage comprises an annular core 11 of magnetic material preferably having a rectangular hysteresis loop, a main one turn shift winding 12, an auxiliary one turn shift winding 13, an input one turn winding 14 and an output five turn winding 15 with an interstage coupling diode D1 poled to carry current from the output winding of the preceding stage when that preceding stage is being reset from ONE to ZERO.

Figure 1A:
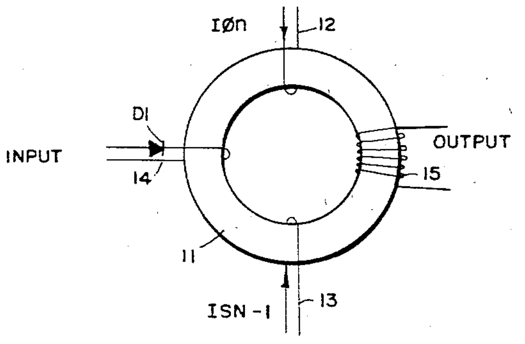
FIG. 1A shows a schematic circuit diagram of a typical four winding core according to the invention.
Figure 1B:
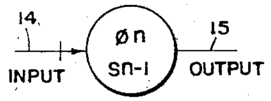
FIG. 1B shows the equivalent logical symbol for the apparatus of FIG. 1A.

The logical symbol equivalent of the stage of FIG. 1A is shown in FIG. 1B. The vertical bar across the input 14 indicates that the current flowing in input 14 inhibits the core from assuming the ONE state. The symbol $\Phi_n$ denotes that the main shift pulse is the $n$th while the designation $S_{n-1}$ denotes that the auxiliary shift pulse occurs when the $n-1$'st main shift pulse causes the preceding state to switch if a ONE is then stored therein.

Referring to FIG. 2, there is shown a graphical representation of typical switching times and typical voltages per turn developed across a winding in response to the magnetomotive force as the common independent variable. The switching time $T_{sw}$ decreases as the driving magnetomotive force increases while the switching voltage per turn increases. When the switching magnetomotive force decreases below the critical value $H_c$, the core does not switch and produces virtually no switching output voltage. It was stated above that it was desirable to keep the switching output voltage below the magnitude of the threshold potential of the coupling diodes so that each coupling diode could effectively block current from flowing from an input winding to a preceding output winding. A typical germanium diode has a threshold potential of the order of 0.25 volts. From FIG. 2 it is seen that the magnetomotive force corresponding to that switching voltage per turn corresponds to 0.30 ampere turns and a switching time of 3.5 microseconds. A switching potential per turn corresponds to 0.18 volt when the magnetomotive force is 0.22 ampere turns and the switching time is 7.5 microseconds. These two operating points will be referred to in the discussion which follows.

Referring to FIG. 3, there is shown a sequence of three successive core stages interconnected according to the invention, the middle stage designated N, the preceding stage designated N+1 and the succeeding stage designated N−1. The N+1 stage includes a core 21, a main shift winding 22, an auxiliary shift winding 23, an input winding 24 and an output winding 25 coupled to input winding 14 of stage N by diode D1. The succeeding stage N−1 includes a magnetic core 31, a main shift winding 32, an auxiliary shift winding 33, an input winding 34 coupled to output winding 15 of the preceding stage N by diode D2 and an output winding 35. The main shift windings 12, 22 and 32 are energized at appropriate times by appropriately phased shift pulses provided by main shift pulse source 26. The auxiliary shift windings 13, 23 and 33 are energized by appropriately phased auxiliary shift pulses provided by auxiliary shift pulse source 27.

Referring to FIG. 4, there is shown a graphical representation of main and auxiliary shift pulses plotted to a common time scale for a five phase system. If N in FIG. 3 is 3, then the current $I_{\phi3}$ pulses are applied to main winding 12 and the $I_{S2}$ pulses are applied to auxiliary winding 13. Similarly, main shift windings 22 and 32 are energized with the main shift pulses $I_{\phi3}$ and $I_{\phi1}$, respectively, while auxiliary shift windings 23 and 33 are energized with the $I_{S3}$ and $I_{S1}$ auxiliary shift pulses, respectively.

As shown in FIG. 4, the magnitude of the main shift current pulses is 1.35 amperes and the duration of each of these pulses is 10 microseconds. Consecutive phases are contiguous, and phase one follows phase five. The duration of each main shift pulse spans a correspondingly phased auxiliary pulse. Each auxiliary pulse is of 4.5 microseconds duration and begins one microsecond after the beginning of the corresponding main shift pulse. Each auxiliary pulse is 0.3 ampere in magnitude, corresponding to an ampere turn that produces the threshold potential of 0.25 volt seen in FIG. 2 and producing switching in 3.5 microseconds.

Thus, the auxiliary shift pulse is sufficiently large in magnitude and duration to switch a core whose input winding is not then being energized. The auxiliary pulse is also sufficiently small in magnitude and rise time so that the potential induced across an input winding when the core is switched is too small to overcome the threshold potential of an intercoupling diode so that no current flows to an output winding in the preceding stage.

At the same time the current pulse provided by output winding 25 in response to a main shift pulse is large enough and of sufficient duration to prevent the auxiliary pulse energizing the auxiliary winding of the succeeding stage from switching that succeeding stage.

The mode of operation will be better understood by considering the following detailed explanation. It is convenient to assume initially that core 11 had been previously set to the ONE state and that current pulse $I_{\phi3}$ current drive becomes active. Since this core had been previously set, the 1.35 ampere turn magnetomotive force applied through main shift winding 12 causes core 11 to switch to the ZERO state. Although the magnitude of the output voltage across output winding 15 in the unloaded state would tend to become quite large, diode D2 is then rendered conductive to carry a current through input winding 34 of core 31. Since the output winding 15 is effectively connected to the constant impedance load presented by input winding 34 through then conductive diode D2, core 11 will reach an operating point determined by the output voltage across winding 15 and the net magnetomotive force through core 11. This is the point corresponding to a magnetomotive force of 0.22 ampere turns and a voltage of 0.18 volt per turn with the switching occurring in substantially 7.5 microseconds shown in FIG. 2. The germanium diode D2 then has a potential of 0.9 volt across it to balance that developed across the five turns of output winding 15 (0.18×five turns), there being then virtually no voltage across winding 34. The current flowing in the diode at this point is 0.226 amperes, representing five times 0.226, or 1.13 ampere turns in core 11. This induced current opposes the 1.35 ampere turns applied to main shift winding 12, leaving a net switching current of 0.22 ampere turns in core 11.

Referring to FIG. 5, there is shown a graphical representation of typical core stage signal waveforms, including voltages. FIG. 5A specifically illustrates the current pulse output provided by winding 15 through diode D2 to the input winding 34 of core 31. Since the magnetomotive force of 0.226 ampere turns opposes the 0.30 ampere turn magnetomotive force shown in FIG. 5B energizing auxiliary shift winding 33 of core 31, the net magnetomotive force of 0.074 ampere turns is below the critical value $H_c$ illustrated in FIG. 2. This net force is therefore insufficient to switch core 31, leaving core 31 in the ZERO state. FIG. 5D shows the voltage output across winding 35 of core 31, the pulses being less than 0.1 volt in amplitude because the core is not being switched. Therefore, input winding 34 of core 31 negligibly loads output winding 15 of core 11 when the latter is switching. And if core 11 had previously been in the ZERO state, the loading on output winding 15 presented by winding 34 would have been immaterial because core 11 would not have been switched by the main shift pulse applied to winding 12.

Considering now the sequence of events which occur with core 11 in the ZERO state, the application of a main shift pulse $I_{\phi3}$ is ineffective in switching core 11, thereby providing negligible output voltage across output winding 15 so that no current flows through diode D2 through input winding 34 of core 31. Therefore, the full amplitude of the auxiliary shift pulse $I_{S3}$ provided by auxiliary shift pulse source 27 and shown in FIG. 5B applied to winding 33 is effective in setting core 31 to the ONE state. Since the magnitude of the magnetomotive force is 0.30 amere turns, core 31 will switch in substantially 3.5 microseconds as shown in FIG. 1 while producing an output potential of 0.25 volts per turn, the 4.5 microsecond duration of the auxiliary pulse shown in FIG. 5B being more than adequate to switch core 31. When core 31 switches to a ONE, diode D3 is reverse-biased, preventing current from flowing in output winding 35. Moreover, even though diode D2 is forward-biased by the potential developed across the single turn of input windinb 34 as core 31 is switched, the 0.25 volt across this turn is insufficient to overcome the threshold voltage characteristics of diode D2 so that this diode remains nonconducting. The auxiliary shift pulse applied to winding 31 completely determines the switching magnetomotive force, and the 0.30 amper turn point of FIG. 2 identifies the operating point of core 31 where switching occurs.

FIG. 5F shows the voltage output of core 31 when being set to the ONE state. FIG. 5G shows the voltage output across an output winding when a ONE is being switched out of a core. Thus, ZERO being switched out allowing the next core to switch on is indicated by a negative pulse at that core while a ONE being switched out is indicated by a positive pulse at the core from which it is switched.

Referring to FIG. 6A there is shown a schematic circuit diagram illustrating means for introducing ONES and ZEROS into the magnetic core loop previously described. The circuit includes a core 41 having a main shift winding 42, an auxiliary shift winding 43, an input winding 44 and an output winding 45 coupled to a succeeding stage by diode D4. The input core 51 has a main shift winding 52, a fourteen turn input winding 54 and a five turn output winding 55 coupled to input winding 44 by diode D5. One end of input winding 54 is connected to the collector of normally nonconductive transistor Q1 having its emitter grounded. The other end of winding 54 is connected to a source of negative potential on terminal 46 through resistor 47 which is bypassed to ground by capacitor 52.

The base of transistor Q1 is normally at ground potential and remains at that potential whenever a ZERO is to be stored in the core loop. However, if a ONE is to be stored, the base input terminal 56 of transistor Q1 assumes a negative potential during the occurrence of a main shift pulse $I_{\phi 3}$ to render transistor Q1 conductive and set core 51. This occurs because condenser 52, previously charged to —10 volts, discharges through winding 54 through transistor Q1. The next main shift pulse $I_{\phi 5}$ then resets core 51 to transfer the data in the manner prescribed above. The only difference between core 51 and core 41 other than the drive time, is that core 51 is set by a transistor circuit and core 41 is set by the occurrence of an auxiliary shift pulse $I_{S5}$ occurring when core 51 is in the ZERO state. The logical equivalent of the circuit of FIG. 6A is shown in FIG. 6B.

Referring to FIG. 7A there is shown a schematic circuit diagram of a circuit for interpreting the output of a magnetic core shift register according to the invention. The output core 61 includes a main shift winding 62, an auxiliary shift winding 63, an input winding 64 and a fourteen turn output winding 65. Diode D6 connects the output winding of the preceding stage to input winding 64. Diode D7 connects the output winding 65 to terminating resistor 66 which develops a signal pulse for setting the flip-flop 67 when a ONE is being transferred out. The flip-flop is reset at a time corresponding to the occurrence of shift pulse $I_{\phi 5}$ by a signal designated $V_{\phi 5}$ applied to the reset input 68. Flip-flop 67 indicates the storage of a ONE when assertion output 71 is at —5 volts and negation output 72 is at zero while ZERO is indicated by assertion output 71 being at zero potential and negation output 72 at —5 volts.

The output core stage is the same as the intermediate core stages with the exception that it has a fourteen turn output winding. The terminating resistance 66 presents a constant impedance load to output winding 65, thereby simulating output loading which would have been presented by the input winding of a following core with diode D7 conducting. Resistor 73 direct couples the output signal across winding 65 to the set input of flip-flop 67, a conventional resistor coupled transistor flip-flop. Capacitor 74 functions to filter extraneous noise pulses which may occur when core 61 is energized by a main shift pulse while in the ZERO state. Since the signal provided by output winding 65 either sets or fails to set flip-flop 67 during the occurrence of a main shift pulse $I_{\phi 2}$, the state of flip-flop 67 between that time and the time $I_{\phi 5}$ when it is reset denotes the output state of the output core. FIG. 7B shows the logical equivalent of the schematic circuit diagram shown in FIG. 7A.

Referring to FIG. 8, there is illustrated the logical arrangement of an eight bit serial circulating loop shift register embodying the principles of the invention. This system comprises input circuitry having a transistor to core driver 75, an input core stage 76 as illustrated in FIG. 6, eight cascaded intermediate core stages 81–88 as illustrated in FIG. 3, and an output core stage 91 with an output flip-flop 92 as illustrated in FIG. 7. The loop is completed by a recirculation gating inverting amplifier 93 and a buffer 94. An input gating inverting amplifier 95 also energizes buffer 94 so that buffer 94 provides the input of transistor to core driver 75 either with recirculated data received from recirculation gate 93 or input data derived from an external source provided by input gate 95.

Input data in serial form on line 101 is gated through input gate 95 when the WRITE IN COMMAND signal conditions leg 96 and leg 97 is conditioned by the occurrence of a clock pulse $V_{\phi 3}$, occurring simultaneously with the main shift pulse $I_{\phi 3}$, Driver 75 sequentially activates the input core 76. At clock time $_{\phi 5}$ the complement of the data thus inserted into core 76 is inserted into core 81. The sequence of shifting and complementing is repeated in the manner described above, occurring in the different symbolically designated cores at the times corresponding to the main and auxiliary shift pulses designated therein. Thus, data introduced to the input stage 76 is shifted through the ten cores in eight pulse periods. Inserted data is available for output eight pulse periods later in flip-flop 92 and can be recirculated through recirculation gate 93 indefinitely.

Referring to FIG. 9, there is shown a graphical representation of signal waveforms plotted to a common time scale showing how the bit pattern represented in FIG. 9D by the output signal waveform on the assertion output of flip-flop 84 produces the indicated signal waveforms as this bit pattern is recirculated over seven pulse periods, there being five phases to each pulse period. Core output voltages are designated V with an appropriate subscript corresponding to the designations F1–F10 of core stages in FIG. 8. The recirculated flip-flop output provided by buffer 94 is designated FFR. The pulse patterns for the second through fifth core stages 82–85 are not shown until a meaningful signal waveform occurs, and the waveforms provided by the sixth and seventh stages have not been shown, but the nature of these waveforms will be apparent from the detailed description above and from reviewing the waveforms of other stages shown in FIG. 9. The core output voltages shown in FIGS. 9G–9M are basically a sequence of voltages similar to those shown in FIGS. 5F and 5G. The waveform in FIG. 9F shows the output of buffer 94 which is basically an inverted sample of the waveform of FIG. 9D at each phase $_{\phi 3}$ clock pulse time represented in FIG. 9C.

The signal waveform of FIG. 9E shows the collector potential of transistor Q1 (FIG. 6A) as capacitor 52 discharges during the interval $_{\phi 3}$–$_{\phi 4}$. The sudden negative spike occurs at the beginning of phase $_{\phi 5}$ pulses shown in FIG. 9A because the input core is then reset to the ZERO state by the contemporaneous $I_{\phi 5}$ main shift pulse.

Referring to FIG. 10, there is shown a diagrammatic representation of a preferred technique for fabricating the invention. This assembly process allows the cores to be assembled in long arrays for handling as a group making up a complete shift register rather than as individual cores. The cores can be physically positioned in a holder oriented as shown in FIG. 10A with the diode leads bent up between the cores. The diode leads can then be used as tie points for the wires that comprise core windings. By starting the winding at point 101, passing it through core 102 five times to form the output winding of core 102, then once through core 106 and back to diode tie point 105, then five times through core 106, once through core 108 to diode tie point 7, five times through core 108 to return point 109, and so on for as many cores as are desired in a register, a single piece of wire forms the input and output windings of each core. After assembling the cores and diodes as described above, the tie ponts, 101, 105, and 107 (connected to diodes 111, 112 and 113, respectively) can be dipped into an insulation removing medium, such as acid, heat and other well-known insulation removing mediums, and then soldered. The resultant array is the equivalent circuit shown in FIG. 10B. The only elements not yet added are the main and auxiliary shift windings. By physically arranging a number of like rows of shift registers constructed in accordance with the technique illustrated in FIG. 10, a single wire may be intertwined among all those core elements shifted by a correspondingly phased main shift pulse. Similarly, another wire may be intertwined among all those core elements in the array energized by the same phased auxiliary shift pulse. The result is that a complete multi-element core matrix may be fabricated with four windings on each core but only $2n+1$ continuous wires throughout the entire matrix where $n$ is the number of phases. Thus, eleven wires are enough for a five phase system.

The specific embodiment described herein incorporated the following physical characteristics and components:

Core material: RCA Type 22M1.
Core size: thickness, .070"; inner diameter, .160"; outer diameter, .260".
Wire size: input and output windings, #30.
main and auxiliary shift windings, #22.
Diode type: IN283A.

There has been described novel methods and means for storing data in an array of magnetic cores and the novel preferred techniques for fabricating such storage systems. The specific examples described herein are by way of example only for illustrating the best mode now contemplated for practicing the invention. It is apparent that those skilled in the art may now make numerous modifications and uses of and departures from the specific embodiments described herein without departing from the inventive concepts. Consequently, the invention is to be construed as limited solely by the spirit and scope of the appended claims.

The embodiments of the invention in which an exclusive property or privilege is claimed are defined as follows:

1. Data signal storage apparatus comprising:
a plurality of magnetic core storage elements each characterized by a substantially rectangular hysteresis characteristic and switchable between set and reset stable states in response to the application of switching energy of sufficient magnitude and duration,
each of said storage elements having an input winding, an output winding, a main shift winding and an auxiliary shift winding,
a unilaterally conducting device coupling the output winding of a first of said storage elements to the input winding of a second of said elements and rendered conductive in response to said first storage element switching from the set state to the reset state while remaining nonconductive when said second element switches from said reset state to said set state,
a source of main shift pulses,
a source of auxiliary shift pulses each occurring in overlapping time relationship with a respective one of said main shift pulses,
means for applying one of said main shift pulses to the main shift winding of said storage element and one of said auxiliary pulses to the auxiliary shift winding of said second storage element in overlapping time relationship so that the main pulse energy establishes the reset state in said first element output winding when that element is thereby switched from the set state which output pulse is coupled by said unilaterally conducting device to the second element input winding to oppose the switching energy then applied to the second element auxiliary winding and prevent said second element from being switched to the set state,
the switching energy then applied to the second element auxiliary winding otherwise being sufficient to establish the set state in said second element.

2. Data signal storage apparatus in accordance with claim 1 and further comprising:
means for providing $n$ phases of said main shift pulses and $n$ corresponding phases of said second shift pulses,
means for energizing the main shift windings of consecutive ones of said storage elements with correspondingly phased main shift pulses,
and means for energizing the auxiliary shift windings of consecutive ones of said storage elements with auxiliary shift pulses of phase differing by one from the phase of the main shift pulses applied to the main shift winding of a respective storage element so that the main shift winding of each core is energized with a main shift pulse in overlapping time relationship with the auxiliary shift pulse applied to the auxiliary shift winding of an immediately following storage element.

3. Data signal storage apparatus in accordance with claim 2 and further comprising:
an input magnetic core storage element characterized by a substantially rectangular hysteresis characteristic and switchable between said set and said reset stable states in response to the application of switching energy of sufficient magnitude and duration,
said input storage element having an input winding, an output winding and a main shift winding,
a unilaterally conducting device coupling the output winding of said input element to the input winding of the first of said plurality of storage elements and rendered conductive in response to said input storage element switching from the set state to the reset state while remaining nonconductive when said the first of said plurality of storage elements switches from said reset state to said set state,
and means for applying one of said main shift pulses to the main shift winding of said input storage element and one of said auxiliary pulses to the auxiliary shift winding of said the first of said plurality of storage elements in overlapping time relationship so that the main pulse energy establishes the reset state in said input element to induce an output pulse across the input element output winding when that element is thereby switched from the set state which output pulse is coupled by the last-mentioned unilaterally conducting device to the input winding of said the first of said plurality of storage elements to oppose the switching energy then applied to the last-mentioned auxiliary shift winding and prevent said the first of said plurality of said elements from being switched to the set state,
the switching energy then applied to the last-mentioned auxiliary shift winding otherwise being sufficient to establish the set state in said the first of said plurality of said elements.

4. Data signal storage apparatus in accordance with claim 3 and further comprising:
an output magnetic core storage element characterized by a substantially rectangular hysteresis characteristic and switchable between said set and said reset stable states in response to the application of switching energy of sufficient magnitude and duration,
said output storage element having an input winding, an output winding, a main shift winding and an auxiliary shift winding,
an output impedance,
a unilaterally conducting device coupling the output winding of said output element to said output impedance and rendered conductive in response to said output storage element switching from the set state to the reset state,
a unilaterally conducting device coupling the output winding of the last of said plurality of storage elements and rendered conductive in response to said last element switching from the set state to the reset state while remaining nonconductive when said output element switches from said reset state to said set state,
means for applying one of said main shift pulses to the main shift winding of said last storage element and one of said auxiliary pulses to the auxiliary shift winding of said output storage element in overlapping time relationship so that the main pulse energy establishes the reset state in said last element to induce an output pulse across the last element output winding when that element is thereby switched from the set state which output pulse is coupled by the last-mentioned unilaterally conducting device to the input winding of said output element to oppose the switching energy then applied to the output element auxiliary shift winding and prevent said output element from then being switched to the set state, the switching energy then applied to the output element auxiliary shift winding otherwise being sufficient to establish the set state in said output element, and means for applying another of said main shift pulses to the main shift pulse of said output element at a time following the application of a main shift pulse to the last element main shift winding to establish the reset state in said output element to induce an output pulse across the input element output winding when that element is thereby switched from the set state which output pulse is coupled to said output impedance.

5. Data signal storage apparatus in accordance with claim 4 and further comprising:

an output flip-flop set in response to said output pulse coupled to said output impedance, and means for restoring said output flip-flop to the reset state prior to the next possible occurrence of a said output pulse.

6. Data signal storage apparatus in accordance with claim 3 and further comprising:

a normally nonconductive input transistor and a capacitor in series with and separated by the input winding of said input element, means for charging said capacitor while said input transistor is nonconductive, and means for selectively rendering said input transistor conductive to discharge said capacitor through the input element input winding and said conducting input transistor to establish the set state in said input element.

7. Data signal storage apparatus in accordance with claim 5 and further comprising:

a normally nonconductive input transistor and a capacitor in series with and separated by the input winding of said input element, means for charging said capacitor while said input transistor is nonconductive, and means for selectively rendering said input transistor conductive to discharge said capacitor through the input element input winding and said conducting input transistor to establish the set state in said input element.

8. Data signal storage apparatus in accordance with claim 7 and further comprising:

a recirculation gate, an input gate, a buffer coupling the outputs of said recirculation gate and said input gate to said input transistor, means for coupling said output flip-flop to an input of said recirculation gate, means for coupling input data to an input of said input gate, and means for selectively conditioning said recirculation gate and said input gate during mutually exclusive time intervals to selectively effect one of recirculation of data in said storage elements and insertion of input data into said storage elements.

9. Data signal storage apparatus in accordance with claim 1 wherein all said input and output windings consist of a continuous conductor.

10. Data signal storage apparatus in accordance with claim 1 wherein each of said input windings have fewer turns than each of said output windings.

11. Data signal storage apparatus in accordance with claim 9 wherein each of said unilaterally conducting devices are connected between the junction of the input winding and output winding of an immediately adjacent core element.

References Cited

UNITED STATES PATENTS

| | | |
|---|---|---|
| 3,095,554 | 6/1963 | Guterman et al. |
| 3,144,639 | 8/1964 | Richard et al. |
| 3,218,464 | 11/1965 | Goatcher. |

STANLEY M. URYNOWICZ, Jr., *Primary Examiner.*